UNITED STATES PATENT OFFICE.

NATHAN GRÜNSTEIN, OF FRANKFORT-ON-THE-MAIN, GERMANY, ASSIGNOR TO THE FIRM OF CHEMISCHE FABRIK GRIESHEIM-ELEKTRON, OF FRANKFORT-ON-THE-MAIN, GERMANY, A CORPORATION OF GERMANY.

METHOD OF REGENERATING MERCURY CATALYSTS.

1,185,499. Specification of Letters Patent. Patented May 30, 1916.

No Drawing. Application filed August 4, 1915. Serial No. 43,667.

*To all whom it may concern:*

Be it known that I, NATHAN GRÜNSTEIN, a subject of the Emperor of Russia, and resident of Frankfort-on-the-Main, at present at Bad Nauheim, Germany, have invented certain new and useful Improvements in the Method of Regenerating Mercury Catalysts, of which the following is a specification.

My invention relates to mercury catalysts and its particular object is a method for regenerating such catalysts when they are exhausted.

In certain processes such as the production of acetic aldehydes by introducing acetylene into acid solutions containing a mercury salt this latter is gradually reduced and becomes ineffective. However the mercury catalysts are not always converted into liquid metallic mercury; besides the liquid mercury more or less of a mercury sludge is formed which can be regenerated only with great difficulty. The sludge referred to is the gray to black colored sediment produced by the action of acetylene on an acid solution containing a mercury salt and consists of a mixture of finely divided mercury, oxid and protoxid combinations of mercury and organic condensation products, the constituents of which have not been clearly determined and which vary in composition. I have now ascertained that it is easy to regenerate such exhausted mercury catalysts by reducing the mercury sludge first of all into the metallic state and then converting the metal into compounds suitable for use as catalysts.

In the practice of my invention the sludge is heated by itself to a higher temperature until the organic matter admixed with it is carbonized, thus causing the mercury to separate out in a liquid state, and the pure mercury is then converted into a suitable compound in a well known manner. The sludge on being heated is split up, carbon and metallic mercury being formed; moreover the organic mercury compounds still present are reduced to metal.

The method described offers the great advantage of producing pure mercury compounds from the sludge, the catalysts reintroduced into the catalytic process being, in consequence thereof, also pure and highly effective and no impurities being introduced in the liquid of reaction, so that the production of acetic aldehyde and other products from acetylene is greatly improved.

Example I: The mercury sludge resulting from the production of acetic aldehyde by aid of acetylene and consisting mainly of an intimate mixture of metallic mercury, organic impurities and some not yet reduced organic mercury compounds, is preferably freed from the water and any liquid mercury by decantation and is then heated, preferably with vigorous stirring, in an iron vessel, on open fire, until carbonization of the organic substances has taken place. The greater part of the mercury contained in the sludge separates out in liquid state; the organic mercury compounds are reduced by the carbon to metallic mercury as well. After cooling the liquid mercury is tapped off, the residue is preferably triturated and the carbon still adhering to the mercury is separated by mechanical means, such as for instance by decanting with water. The last traces of mercury are removed from the carbon by chemical dissolution or by distillation. Almost the whole of the mercury is thus regenerated from the sludge, and if the process is well conducted only traces of mercury remain in the carbon. The liquid mercury obtained is transformed in a well known manner into the compounds used as catalysts.

Further experiments have shown that the exhausted mercury catalysts can be regenerated also by treating great quantities of such catalysts with acetylene in acid solution and at higher temperature. I have ascertained the interesting fact that mercury catalysts which have been almost exhausted in the normal process still show a satisfactory catalytic action provided that greater quantities are used, a great part of the mercury sludge being in this case reduced to liquid metal. Under certain conditions it is even possible to convert the whole of the sludge into liquid metal.

In practising the invention on a commercial scale I prefer combining the two modifications of my regenerating method in such a way that the catalyst exhausted in the normal process is first treated in greater quantities and in acid solution with acetylene, thus transforming the greater part of the sludge into liquid metal, and the residual sludge is then regenerated by heating the sludge until the organic matter admixed therewith is carbonized, as described in Example I, the separated mercury being thereafter converted into a suitable compound.

In regenerating the catalyst in an acid solution it is preferable not to use the catalysts in the normal process up to complete exhaustion, but to remove them as soon as their catalytic effect shows a visible diminution, in order to subject great quantities thereof to the ultimate regenerating treatment.

A specific example of this form of the invention is as follows: 300 parts of sludge obtained as above are treated at 60 to 90 degr. C. with acetylene in 500 parts of diluted acid such as a 3 to 5 per cent. sulfuric acid. The process is preferably carried out in the following manner: An excess of acetylene is introduced into the liquid which is stirred thereby, the aldehyde formed being carried along by the gas. The acetylene in excess is freed from aldehyde by washing and is introduced into the liquid afresh. The treatment with acetylene is carried on as long as a formation of aldehyde can be ascertained. By this treatment a considerable part of the sludge is converted into liquid metallic mercury.

Another considerable part of the sludge may be converted into liquid mercury by washing and drying. The regeneration of the remainder is carried out by carbonization of the sludge as described in Example I.

The aldehyde obtained by the subsequent treatment with acetylene in an almost quantitative yield is obtained from the watery solution in a well known manner.

I claim:—

1. The method of regenerating mercury catalysts which are transformed into sludge in a catalytic process comprising heating the sludge to a temperature sufficient to carbonize the organic material therein, and separating the metallic mercury from the carbon.

2. The method of regenerating mercury catalysts which consists in first subjecting great quantities of the exhausted catalysts to treatment with acetylene in an acid solution to convert the greater part of them into metallic mercury, and heating the remainder to carbonize the organic substances therein.

3. The method of regenerating mercury catalysts which consists in first subjecting great quantities of the partially exhausted catalysts to a treatment with acetylene in an acid solution to convert the greater part of them into metallic mercury, and heating the remainder to carbonize the organic substances therein.

In testimony whereof I have signed my name to this specification in the presence of two subscribing witnesses.

NATHAN GRÜNSTEIN.

Witnesses:
JEAN GRUND,
CARL GRUND.